US012730489B2

(12) United States Patent
Cissoko et al.

(10) Patent No.: US 12,730,489 B2
(45) Date of Patent: Sep. 8, 2026

(54) METHOD FOR CONTROLLING A SERIAL ELECTRICAL DISTRIBUTION SYSTEM AND ASSOCIATED SERIAL POWER DISTRIBUTION SYSTEM

(71) Applicant: Schneider Electric Industries SAS, Rueil-Malmaison (FR)

(72) Inventors: Seyba Cissoko, Seyssins (FR); Malik Megdiche, Eybens (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 0 days.

(21) Appl. No.: 19/193,207

(22) Filed: Apr. 29, 2025

(65) Prior Publication Data

US 2025/0341875 A1 Nov. 6, 2025

(30) Foreign Application Priority Data

May 2, 2024 (FR) ................................ FR2404607

(51) Int. Cl.
*G06F 1/26* (2006.01)
*H02J 3/00* (2026.01)
*H02M 5/458* (2006.01)

(52) U.S. Cl.
CPC .................. *G06F 1/26* (2013.01); *H02J 3/00* (2013.01); *H02M 5/4585* (2013.01)

(58) Field of Classification Search
CPC ....... G06F 1/26; H02J 3/00; H02J 3/36; H02J 3/50; H02J 3/48; H02M 5/4585; H02M 3/3353
See application file for complete search history.

(56) References Cited

U.S. PATENT DOCUMENTS 10,211,630 B1 2/2019 Clidaras et al.
2015/0008746 A1* 1/2015 Youn ........................ G06F 1/30 307/65
2015/0180233 A1* 6/2015 Yamada ................. G06F 1/263 307/65
2020/0395758 A1* 12/2020 Tanaka ...................... H02J 3/36
2023/0137732 A1* 5/2023 Huang ................... H02J 1/102 307/82

OTHER PUBLICATIONS

French Search Report dated Nov. 6, 2024 for corresponding French Patent Application No. 2404607, 2 pages.

* cited by examiner

*Primary Examiner* — Regis J Betsch
*Assistant Examiner* — Alex W Lam
(74) *Attorney, Agent, or Firm* — Wolf, Greenfield & Sacks, P.C.

(57) ABSTRACT

This invention relates to a method of controlling an electrical distribution system comprising a power supply device delivering a medium AC voltage, electrical loads, and a conversion module per electrical load. The input terminals of all modules are connected in series to each other and to the power supply device. Each module includes a converter delivering to its electrical load a low DC voltage from the medium voltage. The method includes, for each module, adjusting the active power delivered by the module based on the operating active power of its electrical load and maintaining a constant apparent power of the module by regulating an amplitude and a phase shift of the voltage at the terminals thereof, based on the active power delivered by the module to its electrical load, the voltage and current delivered by the power supply device to the modules, and the number of modules.

10 Claims, 5 Drawing Sheets

14
24
32
28
20U
30
22
18U
12, 20U
10

METHOD FOR CONTROLLING A SERIAL ELECTRICAL DISTRIBUTION SYSTEM AND ASSOCIATED SERIAL POWER DISTRIBUTION SYSTEM

CROSS-REFERENCE TO RELATED APPLICATIONS

This patent claims priority under 35 U.S.C. § 119 to French Application No. 2404607, filed on May 2, 2024.

This invention relates to a method of controlling an electrical distribution system, particularly a data center, and an associated electrical distribution system.

A data center, also known as a data or computer center, is a facility where multiple equipment items belonging to an information system, such as mainframes, servers, data storage devices, network equipment, and/or telecommunications equipment, are grouped. These devices form electrical loads and are arranged in racks, i.e., cabinets of standardized dimensions. A rack includes one or more devices, usually arranged in rack units or enclosures of standardized dimensions.

The racks in a data center are powered by a power supply device, and the equipment mounted in a rack generally operates at low voltage, i.e., between 48 V and 400 V. The equipment in a data center is electrically connected in parallel to the power source, which then delivers a low-voltage electric current to each rack. Given the high electrical power consumed by a data center, the power supply device is itself powered by a medium-voltage electrical network, i.e., at a voltage between 10 kV and 35 kV, so one or more transformers are needed to convert this medium voltage into the low voltage powering the racks.

The increase in computing power of the equipment, caused notably by the development of artificial intelligence, leads to an increase in the electrical power needed to power this equipment. For example, a rack can consume electrical power up to 100 kW. Thus, the transformers and electrical connections linking the power supply device to the equipment, most often made of copper, must be sized to support significant electrical power (very high current at low voltage), which significantly increases their manufacturing cost and overall dimensions.

In other words, the current architecture of data centers is not suited to the increase in computing power of the equipment due to high installation costs and excessive overall dimensions.

This invention aims to address this drawback by proposing a method of controlling an electrical distribution system, particularly a data center, and proposing an improved corresponding electrical distribution system architecture, with reduced manufacturing cost and overall dimensions.

To this end, the invention relates to a method of controlling an electrical distribution system, the electrical distribution system comprising:

- a power supply device configured to deliver a first current, which is a single-phase AC current, associated with a first voltage, which is a single-phase AC voltage between 10 kV and 35 kV,
- a plurality of electrical loads, such as a data server,
- a plurality of conversion modules, the conversion modules respectively being associated with the electrical loads,
  - each conversion module comprising input terminals and output terminals,
  - the input terminals of all conversion modules being connected in series to each other and to the power supply device, the first current thus flowing between the input terminals of all conversion modules, the first voltage thus being applied to all conversion modules,
  - the output terminals of each conversion module being connected to the electrical load associated with the conversion module,
  - each conversion module comprising a converter, connected to the output terminals of the conversion module and configured to deliver to the associated electrical load, a DC voltage comprised between 48 V and 400 V and a DC current, from the AC voltage at the input terminals of the conversion module, and an AC current flowing between the input terminals of the conversion module, thus delivering active power to the associated electrical load.

The control method comprises, for each conversion module:

- regulating the DC voltage delivered by the conversion module to the associated electrical load to keep it equal to a constant value, based on an operating active power value imposed by the electrical load, and
- maintaining an apparent power of the conversion module equal to a target value, so that the apparent powers of all conversion modules are equal to each other, by regulating an amplitude of the AC voltage at the input terminals of the conversion module and a phase shift between the AC voltage at the input terminals of the conversion module and the AC current flowing between the input terminals of the conversion module, based on:
  - the active power delivered by the conversion module to the associated electrical load,
  - the AC voltage and AC current delivered by the power supply device to the plurality of conversion modules, and
  - the number of conversion modules.

Thanks to the invention, all conversion modules are connected in series to the power supply device that delivers medium voltage, and the medium-to-low voltage conversion is performed by the conversion modules to power the electrical loads, so an intermediate low-voltage distribution network between the power supply device and the electrical loads is no longer necessary, simplifying the electrical infrastructure compared to an architecture where all electrical loads are connected in parallel to a low-voltage power supply device. The material cost of the electrical distribution system, and particularly the amount of copper needed for its creation, is thus reduced, and its compactness is improved.

This architecture, wherein all conversion modules are connected in series to the power supply device and powered at medium voltage, is made possible by the control method of the invention, wherein each conversion module is controlled to maintain an apparent power equal to a target value, so that the apparent powers of all conversion modules are equal to each other, allowing the power supply device to deliver stable electrical power adapted to the needs of the electrical loads and ensuring the operational balance of the electrical distribution system. In summary, the invention allows for a transition from a parallel low-voltage distribution architecture to a series medium-voltage distribution architecture. The invention is particularly advantageous when implemented in an electrical distribution system that is a data center where the electrical loads are arranged in racks.

Advantageously, for each conversion module, maintaining the apparent power of the conversion module equal to a target value is achieved by increasing the reactive power of the conversion module when the operating active power value imposed by the associated electrical load decreases and by decreasing the reactive power of the conversion module when the operating active power value imposed by the associated electrical load increases.

Advantageously, for each conversion module, the amplitude of the AC voltage at the input terminals of the conversion module is regulated to be maintained between a lower voltage limit and an upper voltage limit.

The invention also relates to an electrical distribution system, particularly a data center, comprising:

- a power supply device configured to deliver a first current, which is a single-phase AC current, associated with a first voltage, which is a single-phase AC voltage between 10 kV and 35 kV,
- a plurality of electrical loads, which are, for example, data servers arranged in racks,
- a plurality of conversion modules, the conversion modules being respectively associated with the electrical loads,
  - each conversion module comprising input terminals and output terminals,
  - the input terminals of all conversion modules being connected in series to each other and to the power supply device, the first current thus flowing between the input terminals of all conversion modules, the first voltage thus being applied to all conversion modules,
  - the output terminals of each conversion module being connected to the electrical load associated with the conversion module Each conversion module of this data center comprises:

- a group of transistors, connected between the input terminals of the conversion module,
- at least one capacitive element, connected to the group of transistors,
- a converter, connected to the group of transistors and to the output terminals of the conversion module, and
- an electronic control unit, configured to control each transistor of the group of transistors.

Moreover, the group of transistors of each conversion module is configured to deliver to the converter of the conversion module a DC voltage and a DC current, from the AC voltage at the input terminals of the conversion module and the AC current flowing between the input terminals of the conversion module, and the converter of each conversion module is configured to deliver to the associated electrical load a constant DC voltage between 48 V and 400 V and a DC current, from the DC voltage and DC current delivered by the group of transistors of the conversion module.

In addition, the electronic control unit of each conversion module is configured to regulate the amplitude of the AC voltage at the input terminals of the conversion module and the phase shift between the AC voltage at the input terminals of the conversion module and the AC current flowing between the input terminals of the conversion module, by controlling the group of transistors of the conversion module and using the at least one capacitive element of the conversion module.

According to other advantageous aspects of the invention, the electrical distribution system includes one or more of the following features, taken individually or in all technically possible combinations:

- The electrical distribution system is configured to be controlled by the control method as described above.
- For each conversion module, the electronic control unit is configured to implement the regulation of the DC voltage delivered by the conversion module to the associated electrical load and the maintenance of the apparent power of the conversion module equal to the target value.
- The group of transistors of each conversion module includes insulated-gate bipolar transistors.
- The plurality of conversion modules includes at least ten conversion modules.
- Each conversion module also includes a protection circuit configured to make the single-phase AC current delivered by the power supply device flow between the input terminals of the conversion module by short-circuiting the group of transistors in case of failure of the conversion module and/or the associated electrical load.
- The power supply device is configured to deliver a three-phase AC current and an AC voltage between 10 kV and 35 kV per phase, the first current corresponding to a first phase of the three-phase AC current and the first voltage corresponding to a first phase of the three-phase AC voltage, and the plurality of conversion modules forms a first group of conversion modules. In addition, the electrical distribution system includes a second group of conversion modules and a third group of conversion modules, the conversion modules of the second group of conversion modules and the third group of conversion modules being identical to the conversion modules of the first group of conversion modules, and each respectively being associated with an electrical load. Furthermore:
  - the conversion modules of the first group of conversion modules are connected in series to the power supply device so that the first current flows between the input terminals of all the conversion modules of the first group and so that the first voltage is applied to all the conversion modules of the first group,
  - the conversion modules of the second group of conversion modules are connected in series to the power supply device so that a second single-phase AC current, corresponding to a second phase of the three-phase AC current, flows between the input terminals of all the conversion modules of the second group and so that a second single-phase AC voltage, corresponding to a second phase of the three-phase AC voltage, is applied to all the conversion modules of the second group, and
  - the conversion modules of the third group of conversion modules are connected in series to the power supply device so that a third single-phase AC current, corresponding to a third phase of the three-phase AC current, flows between the input terminals of all the conversion modules of the third group and so that a third single-phase AC voltage, corresponding to a third phase of the three-phase AC voltage, is applied to all the conversion modules of the third group.
- The electrical distribution system is a data center comprising a plurality of racks, each electrical load and each conversion module being associated with a rack, each electrical load being arranged in the associated rack, each conversion module being attached to the associated rack or integrated into the associated rack.

The invention will become clearer upon reading the following description, given solely by way of non-limiting example, and made with reference to the drawings wherein.

Figure 1:
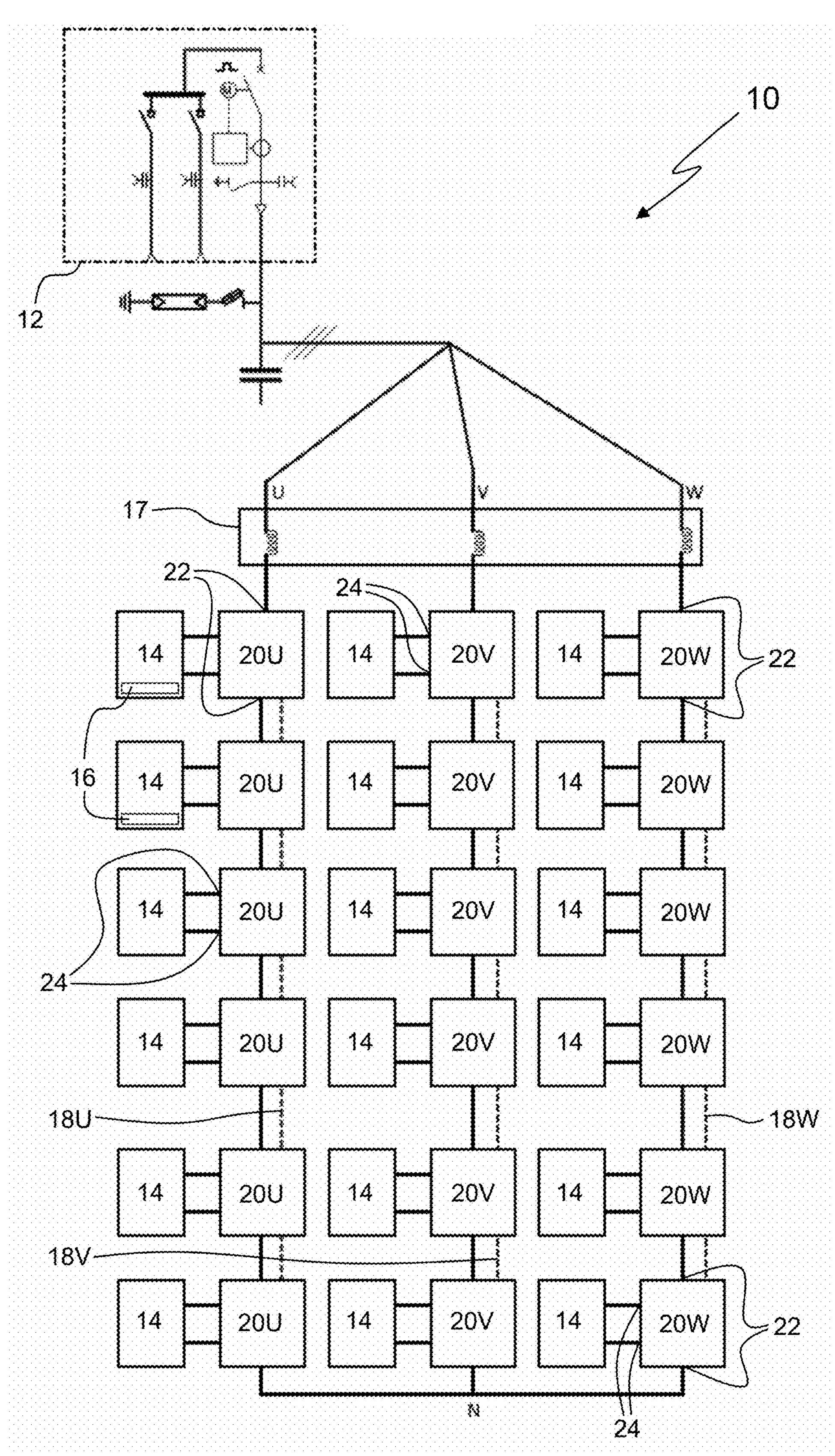
FIG. 1 is a schematic representation of an electrical distribution system according to the invention, comprising several conversion modules.
Figure 3:
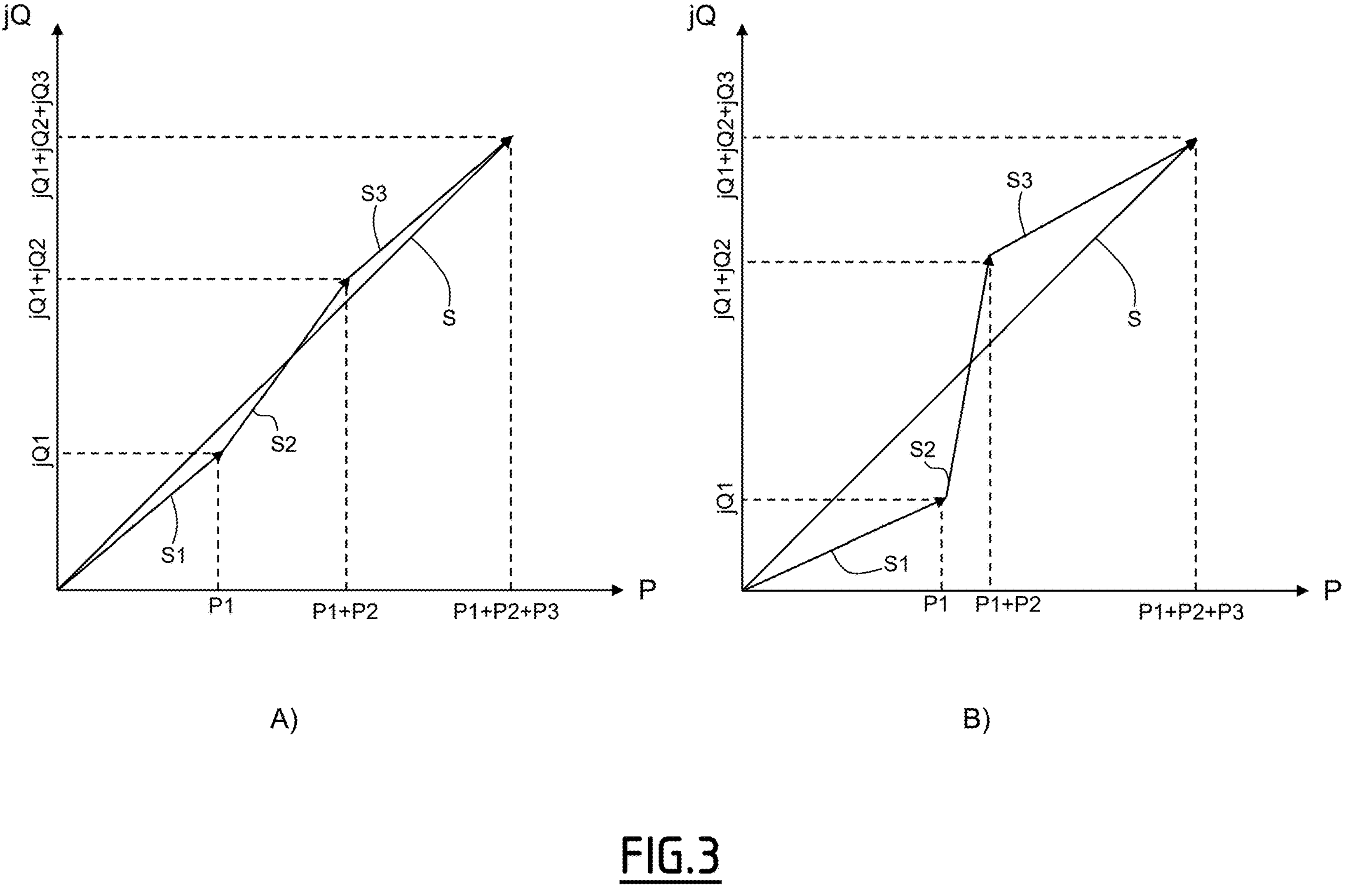

FIG. 3 includes two diagrams illustrating an adjustment of the apparent power of the conversion modules of the electrical distribution system of FIG. 1.

Figure 4:
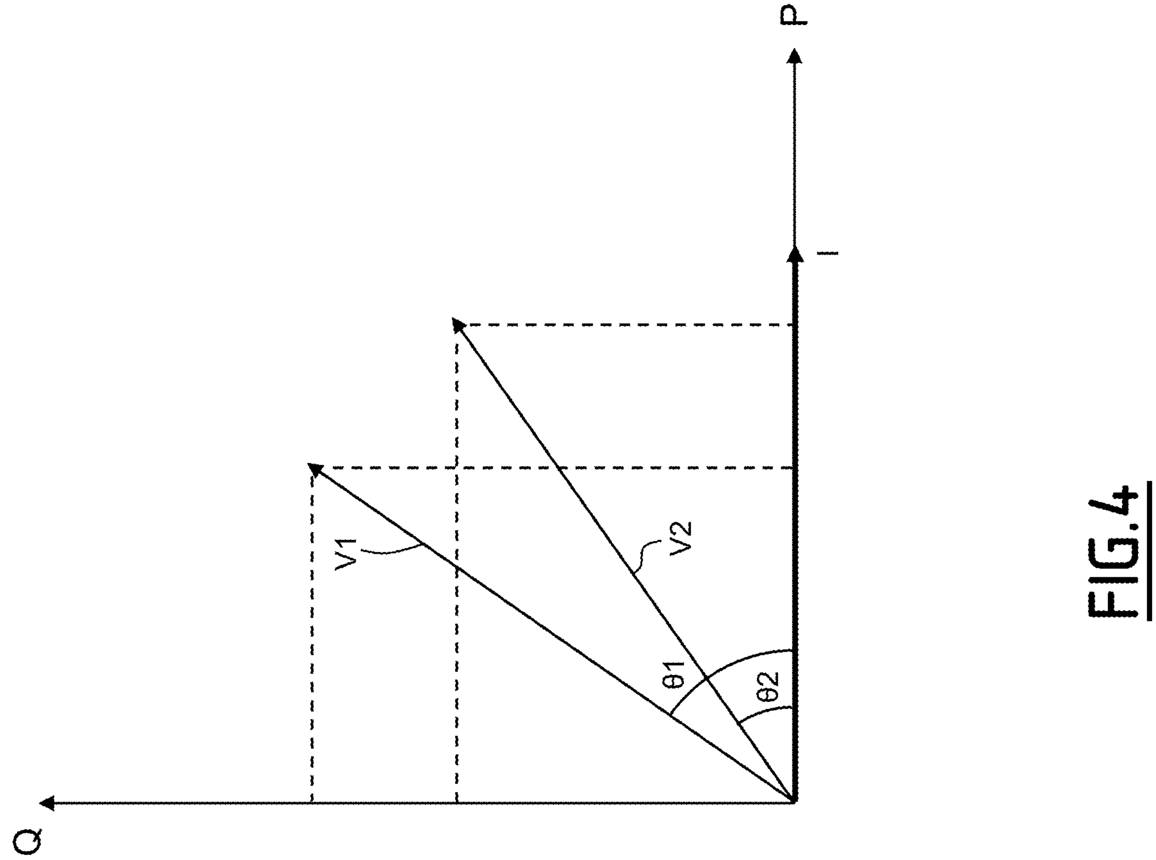

FIG. 4 is a diagram illustrating the impact of the phase shift between the voltage and current of a conversion module on the active power and reactive power of the conversion module, the conversion module belonging to the electrical distribution system of FIG. 1.

Figure 5:
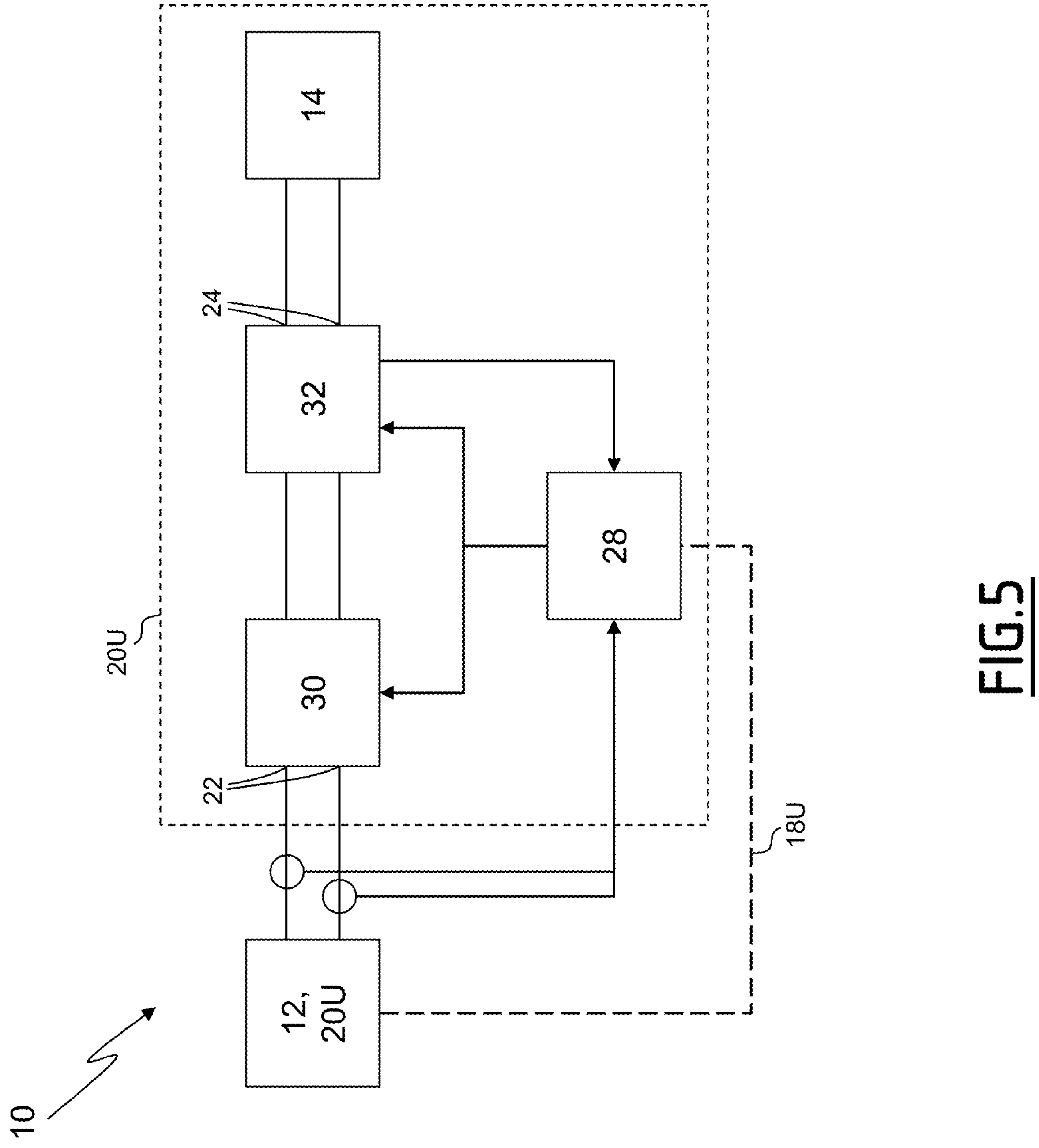

FIG. 5 is a schematic representation of a part of the electrical distribution system of FIG. 1.

An electrical distribution system 10 according to the invention is schematically represented in FIG. 1.

In the example, the electrical distribution system 10 is a data center.

The following description focuses on the implementation of the invention in a data center but is applicable to other types of electrical distribution systems. Thus, alternatively, the electrical distribution system is a machine tool power supply system, for example in the semiconductor field, a regulation device power supply system, or even a building electrical distribution system. In practice, the invention is usable in any industrial or commercial field involving homogeneous and distributed groups of electrical loads, operating at low voltage and medium power, i.e., consuming power from ten to hundreds of kW, and being relatively stable over time.

The data center 10 includes a power supply device 12, which is connected to a power supply network external to the data center 10 and is configured to deliver a three-phase current system, i.e., a three-phase AC current and an AC voltage between 10 kV and 35 kV per phase. This range of 10 kV to 35 kV is more generally referred to as medium voltage. The power supply device 12 thus delivers three phases represented by the letters U, V, and W respectively in FIG. 1.

In the rest of the description, the first current and first voltage refer to the AC current and AC voltage corresponding to a first phase of the three-phase AC current and three-phase AC voltage delivered by the power supply device 12; the second current and second voltage refer to the AC current and AC voltage corresponding to a second phase of the three-phase AC current and three-phase AC voltage delivered by the power supply device 12; and the third current and third voltage refer to the AC current and AC voltage corresponding to a third phase of the three-phase AC current and three-phase AC voltage delivered by the power supply device 12.

The power supply device 12 also includes a neutral, represented by the letter N in FIG. 1.

The operation of the power supply device 12, known per se, is not detailed.

The data center 10 includes a plurality of racks 14. Each rack 14 includes at least one electrical load 16. Each electrical load in a rack corresponds to equipment belonging to an information system, such as mainframes, servers, data storage devices, network equipment, and/or telecommunications equipment. Preferably, the electrical loads in a rack 14 are data servers.

Only two electrical loads 16 are shown in FIG. 1 for clarity. In practice, it is understood that each of the racks 14 includes at least one electrical load 16.

Preferably, the racks 14 of the data center 10 are standardized size cabinets, as known per se. Thus, the design of the racks 14, known per se, is not detailed.

In practice, the electrical loads 16 must be powered with a constant DC voltage between 48 V and 400 V, for example, equal to 48 V. This range of 48 V to 400 V is more generally referred to as low voltage.

The electrical loads 16 in a rack 14 consume electrical power, called active power or real power, which depends on the nature of the electrical load and the operating state of the electrical load, particularly the on or off state thereof and the usage percentage thereof. In practice, the active power consumed by the electrical loads 16 in a rack 14 can reach up to 100 kW or more. In other words, a rack 14 operates at medium power, i.e., between 10 kW and 100 kW.

To provide the electrical power supply of the racks 14 from the power supply device 12, the data center 10 includes as many conversion modules as racks 14. Thus, each conversion module is associated with a rack 14 respectively. In other words, the data center 10 includes as many racks as conversion modules.

Advantageously, each conversion module is attached to the associated rack 14 or is integrated into the associated rack, preferably arranged in a standardized size enclosure or rack unit.

In practice, the conversion modules are divided into three groups: a first group of conversion modules 20U is connected to the first phase U of the power supply device 12, a second group of conversion modules 20V is connected to the second phase V of the power supply device, and a third group of conversion modules 20W is connected to the third phase W of the power supply device.

Advantageously, the conversion modules of the three groups of conversion modules are all identical.

Preferably, each group of conversion modules includes a minimum number of conversion modules 20U, 20V, or 20W to meet the constraints of a medium voltage network as defined in the IEC 62271-1 standard effective Apr. 10, 2021, more specifically as defined in chapter 5.3 of this standard (Assigned insulation level ($U_d$, $U_p$, $U_s$)). This standard, for medium voltage switchgear, defines, among other things, the maximum acceptable permanent voltage, the maximum acceptable transient overvoltage for a duration of one minute, or the lightning impulse withstand voltage. Thus, each group of conversion modules preferably includes at least 10 conversion modules, preferably between 10 and 20 conversion modules, for example, 16 conversion modules. Preferably, all groups of conversion modules include the same number of conversion modules.

The data center also includes a filter 17, which is a medium voltage filter, filtering the first, second, and third voltages U, V, and W upstream of the conversion modules 20U, 20V, and 20W. The filter 17 includes, for example, three inductive elements, such as coils. The filter 17 also attenuates transient voltage variations of the first, second, and third phases, which are likely to damage or disrupt the conversion modules 20U, 20V, and 20W.

In the rest of the description, only the conversion modules 20U of the first group of conversion modules are described. The design and operation of the conversion modules 20V and 20W of the second and third groups of conversion modules are identical to those of the conversion modules 20U of the first group of conversion modules. By analogy, everything described about the conversion modules 20U and the first phase U of the power supply device 12 is also applicable to the conversion modules 20V and the second phase V as well as to the conversion modules 20W and the third phase W.

Each conversion module 20U includes input terminals 22 and output terminals 24.

The input terminals 22 of all conversion modules 20U are connected in series to each other and to the phase U of the power supply device 12. Thus, the first current delivered by the power supply device 12 flows between the input terminals 22 of all conversion modules 20U, and the first voltage is applied to all conversion modules 20U. In other words, the conversion modules 20U are all connected in series to the phase U so that the first current flows between the input terminals 22 of each of the conversion modules 20U, and the first voltage is applied to the terminals of the first group of conversion modules 20U, i.e., the first voltage is applied to all conversion modules 20U.

The conversion modules 20U are also connected in series to the neutral N. Thus, the first voltage corresponds to the voltage measured between the phase U at the power supply device 12 and the neutral N.

Since the same applies to the conversion modules 20V and 20W, the data center 10, which includes three groups of conversion modules each connected to a phase of the power supply device 10 and powered at medium voltage, is thus equivalent to a three-phase medium voltage load in a star connection.

The output terminals 24 of a conversion module 20U are connected to the rack 14 associated with this conversion module 20U.

Moreover, each conversion module 20U includes a converter, which is connected to the output terminals 24 of the conversion module and is configured to deliver to the rack 14 associated with this conversion module 20U, a constant DC voltage between 48 V and 400 V, i.e., a low voltage, and a DC current, from the AC voltage at the input terminals 22 of the conversion module 20U and from the AC current flowing between the input terminals 22 of the conversion module, i.e., from the first current. The converter of each conversion module 20U thus allows delivering active power to the rack 14 associated with the conversion module, to electrically power the at least one electrical load 16 of the rack.

Thus, each conversion module 20U delivers the active power required for the operation of the electrical loads 16 of the rack 14 associated with the conversion module from the first voltage and the first current by means of the converter thereof.

The data center 10 also includes three data buses, respectively noted 18U, 18V, and 18W.

The data bus 18U connects together all the conversion modules 20U of the first group and allows for data exchange between the conversion modules 20U. Preferably, the data bus 18U is a CAN (Controller Area Network) data bus, defined by the ISO 11898 standard.

Similarly, the data bus 18V connects together all the conversion modules 20V of the second group, and the data bus 18W connects together all the conversion modules 20W of the third group.

Figure 2:
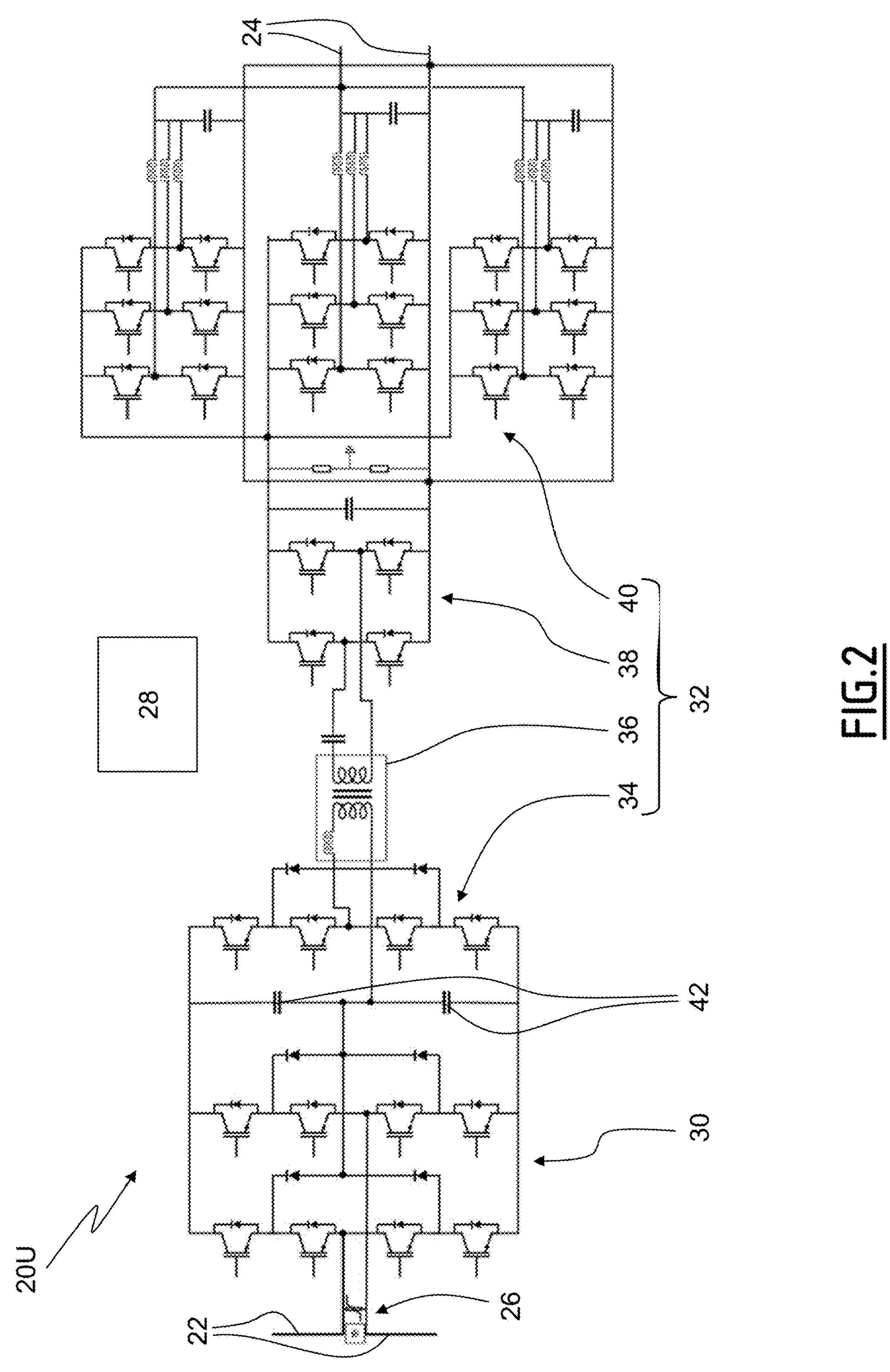
FIG. 2 is a schematic representation of one of the conversion modules of the electrical distribution system of FIG. 1.

An example of a conversion module 20U belonging to the data center 10 is now described with reference to FIG. 2.

Advantageously, the conversion module 20U includes a protection circuit 26, which is connected between the input terminals 22 of the conversion module and is configured to make the first current delivered by the power supply device 12 flow between the input terminals 22 of the conversion module 20U by short-circuiting the group of transistors 30 in case of failure of the conversion module and/or the at least one electrical load 16 of the rack 14 associated with the conversion module.

When a conversion module 20U is short-circuited by its protection circuit 26, it is said to be inactive and cannot deliver power to the associated rack. Otherwise, it is said to be active and is able to electrically power the associated rack.

In the example, the protection circuit 26 is a switch, called a bypass switch. The switch 26 is normally open. When commanded to be closed, the switch 26 allows the conversion module 20U to be short-circuited by directly connecting the input terminals 22, thus allowing a conversion module 20U and the associated rack 14 to be disconnected without interrupting the series connection of the other conversion modules 20U of the first group of conversion modules.

The conversion module 20U includes an electronic control unit 28.

The conversion module 20U includes a group of transistors 30, connected between the input terminals 22 of the conversion module 20U. In other words, the first current generated by the power supply device 12 flows between the input terminals 22 of the conversion module 20U in the first group of transistors 30.

The electronic control unit 28 is configured to control each transistor of the group of transistors 30.

In practice, the transistors of the group of transistors 30 are controlled by the electronic control unit 28 so that the group of transistors 30 acts as a rectifier, i.e., as an AC-DC converter. Thus, the group of transistors 30 is powered via the input terminals 22 by the first current and the first voltage delivered by the power supply device 12 and delivers an intermediate voltage, which is a DC voltage preferably between 600 V and 1000 V. In other words, the group of transistors 30 is controlled to convert the first AC voltage, between 10 kV and 35 kV, into an intermediate DC voltage between 600 V and 1000 V.

The operation of the group of transistors 30 as a rectifier, known per se, is not described in more detail.

Preferably, the transistors of the group of transistors 30 are metal-oxide-semiconductor field-effect transistors, more commonly known as MOSFETs. Preferably, the transistors are silicon carbide MOSFETs, known under the acronym "SIC MOSFET." The use of such transistors allows the group of transistors to operate reliably while maximizing its efficiency. Moreover, these transistors also allow higher operating frequencies, thus contributing to the optimization of the data center 10.

Alternatively, the transistors of the group of transistors 30 are insulated-gate bipolar transistors, more commonly known as IGBTs, (Insulated-gate bipolar transistor)r.

As described above, the conversion module 20U includes a converter noted 32, connected on the one hand to the group of transistors 30 and on the other hand to the output terminals 24 of the conversion module. The converter 32 allows the intermediate DC voltage delivered by the group of transistors 30 to be converted into the low voltage delivered to the rack 14 associated with the conversion module.

The converter 32 includes a first group of transistors 34, a medium-frequency transformer 36, and a second group of transistors 38, which together form a first DC-DC conversion stage, which converts the intermediate voltage into a lower DC voltage, 400 V in the example. The value of this voltage may be different from 400 V but is preferably between 200 V and 600 V. This voltage range corresponds to voltages that can be directly used in standard racks, equipped with power supply units (PSU) that can transform this voltage to 48 V and/or 12 V.

The medium-frequency transformer 36 ensures isolation between the medium voltage and the low voltage according to the constraints defined in the IEC 60076-3 standards in force in 2013 and IEC 62271-1 in force on Apr. 10, 2021.

The operation of the first DC-DC conversion stage formed by the first group of transistors 34, the medium-frequency transformer 36, and the second group of transistors 38, known per se, is not detailed. For example, the first conversion stage can be formed by an LLC converter or a DAB (dual active bridge) converter.

Preferably, the entire first DC-DC conversion stage forms a solid-state transformer (SST).

In the example, the converter 32 also includes a second DC-DC conversion stage, formed by a third group of transistors 40, which is connected to the second group of transistors 38 and converts the 400 V DC voltage obtained through the first DC-DC conversion stage into a lower voltage DC voltage, 48V in the example. The value of this voltage may be different from 48 V but is preferably between 48 V and 54 V.

The operation of the second DC-DC conversion stage formed by the third group of transistors 40, known per se, is not detailed. For example, the second conversion stage can be formed by a Buck converter, also known as a series chopper.

The second DC-DC conversion stage of the converter 32 is connected to the output terminals 24 of the conversion module 20U, so that the 48 V DC voltage is delivered to the output terminals 24 and thus to the rack 14 associated with the conversion module.

The second DC-DC conversion stage of the converter 32 is optional: when it is not present, the first DC-DC conversion stage of the converter 32 is connected to the output terminals 24 of the conversion module 20U, so that the 400 V DC voltage is delivered directly to the output terminals 24 and thus to the rack 14 associated with the conversion module. In practice, the choice whether or not to integrate a second DC-DC conversion stage into the converter 32 of the conversion module 20U is made based on the operating voltage of the electrical loads 16 of the associated rack 14.

By means of the medium-frequency transformer 36, the conversion module 20U benefits from galvanic isolation between its input terminals 22 and its output terminals 24, with an isolation level between 20 kV and 50 kV between its input terminals 22 and its output terminals 24, which offers protection to the electrical loads 16 of the associated rack 14.

By means of the group of transistors 30 functioning as a rectifier and by means of the two conversion stages of the conversion module 20U, the electrical loads 16 of the associated rack 14 benefit from effective protection by avoiding the transmission of faults present in the power supplied by the power supply device, such as voltage spikes and dips.

The conversion module 20U includes at least one capacitive element 42, connected to the group of transistors 30 and, in the example, also connected to the second group of transistors 34 of the converter 32. In the example, the at least one capacitive element 42 is formed by two capacitors 42. In a variant (not shown), of the invention the at least one capacitive element 42 includes a different number of capacitors and/or one or more other capacitive electronic components.

A method of controlling the data center 10, the control method being as per the invention, is now described.

The control method is described with reference to the first group of conversion modules 20U, i.e., with reference to the first phase U delivered by the power supply device 12. This control method applies in the same way to the second and third groups of conversion modules 20V, 20W.

In the rest of the description, when referring to a voltage, this voltage is considered at the fundamental frequency of the network, i.e., at the fundamental frequency delivered by the power supply device 12, for example, equal to 50 Hz. Thus, harmonic phenomena are not described.

For the first group of conversion modules 20U of the data center 10, the following parameters are imposed:

- The active power consumed by each rack 14 is imposed by the at least one electrical load 16 of the rack and thus corresponds to the operating active power of the at least one electrical load of the rack.
- The first voltage, i.e., the voltage measured between the phase U at the power supply device 12 and the neutral N and applied to all the conversion modules 20U, is imposed by the power supply device 12 and is constant.
- The first current, i.e., the current delivered by the power supply device 12 and flowing through all the conversion modules 20U, is imposed by the electrical loads 16 of the racks 14 and results from the sum of the currents absorbed by the electrical loads 16, neglecting line losses.
- The apparent power delivered by the power supply device 12 is imposed by the first voltage and the first current, as same is proportional to the product of the first voltage and the first current.

Moreover, the architecture of the data center 10, with the conversion modules 20U connected in series to the first phase of the power supply device 12, implies that the sum of the voltage at the input terminals 22 of each conversion module 20U depends on the first voltage delivered by the power supply device 12 and the power regulation implemented by the control method. In practice, the first voltage delivered by the power supply device 12 is equal to the sum of the sum of the voltage at the input terminals 22 of each conversion module 20U and the voltage at the terminals of the filter 17, for the first phase.

Furthermore, for each conversion module 20U, the voltage between the input terminals of the conversion module must be controlled by being maintained between a predefined lower limit and a predefined upper limit, particularly to ensure the proper functioning of the group of transistors 30.

Since the first voltage is constant, this architecture of the data center 10 requires a permanent balancing of the voltage at the input terminals of each conversion module 20U, so that the sum of the voltages at the terminals of each of the conversion modules 20U remains balanced and so that the voltage between the input terminals of each conversion module is maintained between the predefined lower limit and the predefined upper limit. The control method of the invention thus aims to balance the voltages between all the conversion modules 20U.

Moreover, since the first current is common to all the conversion modules 20U, balancing the voltages of the conversion modules 20U is equivalent to balancing the apparent powers of the conversion modules. Indeed, the apparent power of a conversion module 20U is proportional to the product of the first current flowing between its input terminals 22 and the voltage between the input terminals thereof, the first current being imposed.

The problem is then that variations in active power consumed by a rack 14 can lead to an imbalance in the apparent power of the associated conversion module 20U: the control method of the invention aims to prevent this imbalance.

Thus, to maintain the balance of the operation of the first group of conversion modules 20U, the objective of the control method of the invention is to distribute the apparent power delivered by the power supply device 12 among all the conversion modules 20U, so that the apparent powers of all the conversion modules are equal to each other. Moreover, the sum of the apparent powers of the conversion modules being equal to the apparent power delivered by the power supply device 12, the apparent powers of all the conversion modules are also constant when the apparent power delivered by the power supply device 12 is constant.

The control method of the invention is particularly relevant in applications where the first current is relatively stable, i.e., in applications where the electrical power consumed by all the electrical loads 16 is relatively homogeneous, in other words, in applications where the active power consumed by the racks 14 varies little over time.

Thus, in a first approximation, it is possible to consider that the sum of the active powers consumed by all the racks 14 remains homogeneous and uniformly distributed over time, so that the apparent power delivered by the power supply device 12 also remains constant over time, and therefore that the apparent power of each conversion module 20U also remains constant over time.

The target value to which the apparent power of a conversion module 20U is sought to be maintained equal is therefore equal to the value of the apparent power delivered by the power supply device 12 divided by the number of conversion modules 20U connected in series to the power supply device 12, counting only the active conversion modules 20U, i.e., not counting any conversion modules 20U short-circuited by their protection circuit 26.

To achieve this objective of equal apparent power of a conversion module 20U among all the conversion modules despite the variability of the active power consumed by the electrical loads 16 of the rack 14 associated with the conversion module, the control method of the invention aims to vary the reactive power of the conversion module. In other words, for each conversion module 20U, variations in active power consumed by the associated rack 14 are compensated by a variation in the reactive power of the conversion module.

Thus, each conversion module 20U is controlled:

- to regulate the DC voltage delivered by the conversion module 20U to the associated rack 14, based on the value of the operating active power imposed by the at least one electrical load 16 of the rack, so that the active power delivered by the conversion module 20U is equal to this operating active power, and
- to maintain the apparent power of the conversion module 20U equal to the target value, so that the apparent powers of all the conversion modules (20U) are equal to each other, by regulating the amplitude of the AC voltage at the input terminals 22 of the conversion module and a phase shift between the AC voltage at the input terminals of the conversion module and the AC current flowing between the input terminals of the conversion module, based on:
  - the active power delivered by the conversion module 20U to the associated rack 14, imposed by the at least one electrical load 16 of the rack,
  - the first voltage and the first current delivered by the power supply device 12 to the plurality of conversion modules 20U, and
  - the number of active conversion modules 20U.

In practice, the regulation of the DC voltage delivered by the conversion module 20U to the associated rack 14 consists of maintaining constant, the low voltage delivered to the rack 14, despite variations in operating active power of the electrical load 16 of the rack, as said variations in operating active power would lead to variations in the voltage delivered by the conversion module to the rack in the absence of regulation.

Advantageously, each conversion module 20U knows the measurements of the first voltage and the first current as well as the number of active conversion modules 20U by means of the data bus 18U, which allows this information to be exchanged between all the conversion modules 20U.

In other words, each conversion module 20U will act on the phase shift between the voltage between the input terminals 22 thereof and the first current flowing between the input terminals thereof, as well as on the amplitude of the voltage between the input terminals thereof, to increase or decrease the reactive power thereof depending on the decreases or increases in the active power delivered to the associated rack, so as to maintain a constant apparent power.

Thus, maintaining the apparent power of a conversion module 20U equal to the target value is achieved by increasing the reactive power of the conversion module when the operating active power value imposed by the at least one electrical load of the associated rack decreases and by decreasing the reactive power of the conversion module when the operating active power value imposed by the at least one electrical load of the associated rack increases.

Moreover, the regulation of the amplitude of the AC voltage at the input terminals 22 of the conversion module 20U aims to maintain this voltage between the predefined lower limit and the predefined upper limit.

In practice, the adjustment of the amplitude of the AC voltage at the input terminals 22 of the conversion module 20U and the adjustment of the phase shift between the AC voltage at the input terminals of the conversion module and the AC current flowing between the input terminals of the conversion module, i.e., the regulation of the apparent power at the input of a conversion module 20U, are carried out by the electronic control unit 28 of the conversion module, by controlling the group of transistors 30 and using the at least one capacitive element 42, which then forms a DC voltage source for the group of transistors 30.

The group of transistors 30 of a conversion module 20U thus has two functions: on the one hand, to rectify the AC voltage between the input terminals 22 of the conversion module to deliver the intermediate DC voltage to the converter 32 and then to the associated rack 14, and on the other hand, to regulate the reactive power of the conversion module.

Thus, variations in amplitude and phase of the voltage between the input terminals 22 of a conversion module 20U allow the apparent power of this conversion module to be distributed between active power and reactive power.

In practice, when the data center 10 is in steady state, i.e., when the intensity of the first current is substantially constant, then the amplitude of the voltage between the input terminals 22 of a conversion module 20U remains constant, and only the phase shift between the AC voltage at the input terminals of the conversion module and the AC current flowing between the input terminals of the conversion module varies when the active power delivered to the associated rack varies to maintain a constant apparent power.

Two diagrams illustrating this adjustment of the reactive power of each conversion module 20U to maintain a constant apparent power are illustrated in FIG. 3. In this figure, two simplified diagrams are represented, each corresponding to a hypothetical case where the first group of conversion modules 20U would include three conversion modules 20U. The apparent powers of these three modules are respectively represented as S1, S2, and S3 and each decompose into the sum of an active power P1, P2, P3 and a reactive power Q1, Q2, and Q3.

In diagram A), a nominal operation is illustrated, wherein the active powers P1, P2, P3 delivered by each of the three conversion modules 20U to their respective racks 14 are similar.

In diagram B), an unbalanced operation is illustrated, not representative of the normal operation of the data center 10, wherein the second conversion module 20U delivers to its respective rack 14 an active power P2 significantly lower than the active powers P1, P3 delivered by the first and third conversion modules to the respective racks thereof. It is then understood that such unbalanced operation leads to the appearance of significant reactive power in the first group of conversion modules 20U, which decreases the efficiency of the data center and notably the efficiency thereof.

In these graphical representations, the distribution of active and reactive powers between the three conversion modules 20U is illustrated, in application of the Boucherot method, also referred to as the Boucherot theorem. It is then observed that the total apparent power S delivered by the power supply device 12 is equal to the sum of the apparent powers S1, S2, and S3 and that, to maintain equal apparent power among all the conversion modules 20U, each conversion module acts as a variable impedance, i.e., each conversion module varies the power factor thereof, corresponding to the ratio of the active power thereof to the apparent power thereof, by modifying the reactive power thereof based on the active power thereof.

This concept is illustrated in the diagram of FIG. 4, in which the first current flowing between the input terminals 22 of a conversion module 20U, noted "I," as well as two distinct theoretical voltages between the input terminals of the conversion module, are represented:

- a first voltage V1, corresponding to a phase shift θ1 between the first current and the voltage, and
- a second voltage V2, corresponding to a phase shift θ2 between the first current and the voltage, the phase shift θ2 being smaller than the phase shift θ1.

On this graph, the abscissa represents the active power P of the conversion module 20U, and the ordinate represents the reactive power Q of the conversion module. It is then understood that the greater the phase shift between the voltage and the current, the more the active power P decreases, and the reactive power Q increases.

To implement the reactive power regulation of a conversion module 20U, i.e., the amplitude of the voltage between the input terminals 22 thereof and the phase shift between this voltage and the first current, the electronic control unit 28 of each conversion module 20U first obtains the following data:

- the number of conversion modules 20U, obtained via the data bus 18U;
- the value of the first voltage delivered by the power supply device 12, obtained via the data bus 18U;
- the value of the first current delivered by the power supply device 12, measured at the input terminals 22 of the conversion module 20U or, alternatively, obtained via the data bus 18U;
- the value of the voltage between the input terminals 22 of the conversion module 20U, measured by the conversion module; and
- the value of the active power delivered by the converter 32 of the conversion module 20U to the associated rack 14.

From this data, the electronic control unit 28 calculates the phase shift between the voltage between the input terminals 22 of the conversion module 20U and the first current flowing between the input terminals of the conversion module, and calculates the target value of apparent power of the conversion module 20U, i.e., the apparent power that the conversion module must take to balance the operation of the modules in series on the first phase U delivered by the power supply device 12 of the data center 10.

The electronic control unit 28 then regulates the following parameters of the conversion module 20U:

- the voltage between the input terminals 22 of the conversion module 20U and the phase shift between the voltage between the input terminals 22 of the conversion module 20U and the first current flowing between the input terminals of the conversion module, by controlling the transistors of the first group of transistors 30 and using the at least one capacitive element 42, to reach the target value of apparent power; and
- the active power delivered by the converter 32 to the associated rack 14, by controlling the transistors of the first, second, and, if applicable, third groups of transistors 34, 38, 40 of the converter 32.

This operation of the electronic control unit 28 of a conversion module 20U is schematically illustrated in FIG. 5, on which the data center 10 and said conversion module 20U are represented in a simplified manner. Notably, the other conversion modules 20U and the power supply device 12 are represented with a single box. It is understood that said conversion module 20U is connected in series to the other conversion modules and the power supply device 12 as represented in FIG. 1.

In FIG. 5, the measurements made by the electronic control unit 28 are represented by arrows pointing towards the electronic control unit, and the commands issued by the electronic control unit 28 are represented by arrows departing from the electronic control unit.

Each electronic control unit 28 performs these actions in real-time, i.e., in practice, at the fundamental frequency of the network powering the power supply device 12 with electrical energy, for example, 50 Hz.

Particularly advantageously, the failure of a conversion module 20U leads to the disconnection of the associated rack 14 but does not disrupt the operation of the other conversion modules. Indeed, when a conversion module fails and becomes inactive, the electronic control units 28 of the other conversion modules are informed since the data bus 18U informs all the conversion modules of the number of active conversion modules. In such a situation, the voltage between the input terminals of the active conversion modules will increase to compensate for the loss of the failing conversion module.

The control method according to the invention thus ensures a permanent balancing of the voltages at the input terminals 22 of the conversion modules 20U and has the advantage of operating without centralized control, i.e., centralized control of the conversion modules 20U is not necessary, each conversion module operating autonomously by means of the electronic control unit 28 thereof. This decentralized control is particularly advantageous for simplifying the management of the data center 10.

Advantageously, the data center is designed so that, in steady state, the intensities of the first, second, and third currents are substantially equal to each other, i.e., all the racks 14 respectively associated with the conversion modules 20U, the conversion modules 20V, and the conversion modules 20W consume substantially equal electrical power. Thus, the first, second, and third phases U, V, and W are balanced.

Using the control method of the invention, it is possible to connect all the racks 14 in series to a medium voltage source and thus obtain the architecture of the data center 10 of the invention. In such an architecture, power transmission from the power supply device 12 to the racks 14 is carried out at medium voltage, whereas in data center architectures, this transmission is carried out at low voltage. The fact that this power transmission is carried out at medium voltage rather than low voltage allows the intensity of the associated current to be reduced, at equal power, which allows the cross-section of the electrical conductors through which this power is transmitted to be reduced.

Thus, compared to a known architecture wherein all the racks are connected in parallel to a power supply device delivering low voltage, the installation cost of the data center 10 according to the invention is reduced by at least 15%, notably because of the reduction in the amount of copper needed to make the electrical connections, since the cross-sections thereof are reduced. Moreover, the overall dimensions of the data center 10 is reduced by at least 20%, since the conversion modules 20U can be integrated into the racks 14 or attached to the racks, and since it is no longer necessary to use medium-to-low voltage converters powering the racks 14 in parallel.

Furthermore, compared to a traditional installation, the installation cost, i.e., deployment, of the data center 10 according to the invention is reduced, since the deployment of the conversion modules 20U, 20V, 20W in series offers more flexibility and modularity, and since the installation of medium-to-low voltage transformers is no longer necessary.

Finally, compared to a traditional installation, the data center 10 according to the invention is more easily modifiable during the use thereof, as it is easier to add new racks 14 to an existing installation with a series architecture, and the maintenance cost thereof is reduced, as replacing a failing conversion module 20U, 20V, 20W is easy.

The data center 10 of the invention is particularly suited to data centers, as in this type of application, the electrical loads 16 are relatively stable and relatively evenly distributed among the racks 14. Indeed, in a system with too much disparity between electrical loads, significant reactive power can be generated by some conversion modules to compensate for the low power consumed by the loads thereof, which decreases the efficiency of the data center.

In a variant of the invention (not shown), the power supply device 12 delivers a single-phase voltage instead of a three-phase voltage. In such a variant, the operation of the first group of conversion modules 20U remains unchanged, and the data center 10 only comprises this first group of conversion modules.

In a variant of the invention (not shown), the conversion modules 20U, 20V, and 20W are not controlled by the electronic control unit 28 thereof, but by a centralized electronic control unit of the data center 10. Such a variant has the advantage of allowing for better supervision of the occurrence of faults within the conversion modules and simpler management of reconfigurations of the conversion modules in case of failure and/or replacement of one of them, but increases the complexity of implementing the control method of the invention and entails a risk of disruption of this method, in case of failure during data and command exchange between the centralized electronic control unit and the conversion modules and/or due to the distance that may separate the centralized control unit from the conversion modules.

The invention has been described in an example where the electrical distribution system is a data center, each conversion module being associated with a rack 14 comprising one or more electrical loads 16. Alternatively, a more general way of describing the invention, also applicable when the electrical distribution system is not a data center, is to consider that each conversion module is associated with an electrical load 16, whether this electrical load 16 is a rack 14, an electric motor, a regulation device, or any other electricity-consuming device. Thus, in such a description, a rack 14 and the electrical loads 16 associated with same are functionally identical to an electrical load 16.

Any feature described for one variant in the foregoing can be implemented for the other variants described above, as long as technically feasible.

The invention claimed is:

1. A method of controlling an electrical distribution system, the electrical distribution system comprising:

a power supply device, configured to deliver a first current, which is a single-phase AC current, associated with a first voltage, which is a single-phase AC voltage between 10 kV and 35 kV, a plurality of electrical loads, and a plurality of conversion modules, the conversion modules being respectively associated with the electrical loads, each conversion module comprising input terminals and output terminals, the input terminals of all conversion modules being connected in series to each other and to the power supply device, the first current thus flowing between the input terminals of all conversion modules, the first voltage being thus applied to all conversion modules, the output terminals of each conversion module being connected to the electrical load associated with the conversion module, and each conversion module comprising a converter, connected to the output terminals of the conversion module and configured to deliver to the associated electrical load a DC voltage between 48 V and 400 V and a DC current, from the AC voltage at the input terminals of the conversion module and the AC current flowing between the input terminals of the conversion module, thus delivering active power to the associated electrical load, and the control method comprising, for each conversion module:

regulating the DC voltage delivered by the conversion module to the associated electrical load, to keep said DC voltage equal to a constant value, based on an operating active power value imposed by the electrical load, and maintaining an apparent power of the conversion module equal to a target value, so that the apparent powers of all conversion modules are equal to each other, by regulating an amplitude of the AC voltage at the input terminals of the conversion module and a phase shift between the AC voltage at the input terminals of the conversion module and the AC current flowing between the input terminals of the conversion module, based on:

the active power delivered by the conversion module to the associated electrical load, the AC voltage and AC current delivered by the power supply device to the plurality of conversion modules, and a number of conversion modules.

2. The control method according to claim 1, wherein, for each conversion module, maintaining the apparent power of the conversion module equal to a target value is achieved by increasing a reactive power of the conversion module when the operating active power value imposed by the associated electrical load decreases and by decreasing the reactive power of the conversion module when the operating active power value imposed by the associated electrical load increases.

3. The control method according to claim 1, wherein, for each conversion module, the amplitude of the AC voltage at the input terminals of the conversion module is regulated to be maintained between a lower voltage limit and an upper voltage limit.

4. An electrical distribution system, comprising:

a power supply device, configured to deliver a first current, which is a single-phase AC current, associated with a first voltage, which is a single-phase AC voltage between 10 kV and 35 kV, a plurality of electrical loads, and a plurality of conversion modules, the conversion modules being respectively associated with the electrical loads, each conversion module comprising input terminals and output terminals, the input terminals of all conversion modules being connected in series to each other and to the power supply device, the first current thus flowing between the input terminals of all conversion modules, the first voltage being thus applied to all conversion modules, and the output terminals of each conversion module being connected to the electrical load associated with the conversion module, wherein each conversion module comprises:

a group of transistors, connected between the input terminals of the conversion module, at least one capacitive element, connected to the group of transistors, a converter, connected to the group of transistors and to the output terminals of the conversion module, and an electronic control unit, configured to control each transistor of the group of transistors, wherein the group of transistors of each conversion module is configured to deliver to the converter of the conversion module a DC voltage and a DC current, from the AC voltage at the input terminals of the conversion module and the AC current flowing between the input terminals of the conversion module, wherein the converter of each conversion module is configured to deliver to the associated electrical load a constant DC voltage between 48 V and 400 V and a DC current, from the DC voltage and DC current delivered by the group of transistors of the conversion module, and wherein the electronic control unit of each conversion module is configured to regulate an amplitude of the AC voltage at the input terminals of the conversion module and a phase shift between the AC voltage at the input terminals of the conversion module and the AC current flowing between the input terminals of the conversion module, by controlling the group of transistors of the conversion module and using the at least one capacitive element of the conversion module.

5. An electrical distribution system, comprising:

a power supply device, configured to deliver a first current, which is a single-phase AC current, associated with a first voltage, which is a single-phase AC voltage between 10 kV and 35 kV, a plurality of electrical loads, and a plurality of conversion modules, the conversion modules being respectively associated with the electrical loads, each conversion module comprising input terminals and output terminals, the input terminals of all conversion modules being connected in series to each other and to the power supply device, the first current thus flowing between the input terminals of all conversion modules, the first voltage being thus applied to all conversion modules, and the output terminals of each conversion module being connected to the electrical load associated with the conversion module, wherein each conversion module comprises:

a group of transistors, connected between the input terminals of the conversion module, at least one capacitive element, connected to the group of transistors, a converter, connected to the group of transistors and to the output terminals of the conversion module, and an electronic control unit, configured to control each transistor of the group of transistors, wherein the group of transistors of each conversion module is configured to deliver to the converter of the conversion module a DC voltage and a DC current, from the AC voltage at the input terminals of the conversion module and the AC current flowing between the input terminals of the conversion module, wherein the converter of each conversion module is configured to deliver to the associated electrical load a constant DC voltage between 48 V and 400 V and a DC current, from the DC voltage and DC current delivered by the group of transistors of the conversion module, wherein the electronic control unit of each conversion module is configured to regulate the amplitude of the AC voltage at the input terminals of the conversion module and the phase shift between the AC voltage at the input terminals of the conversion module and the AC current flowing between the input terminals of the conversion module, by controlling the group of transistors of the conversion module and using the at least one capacitive element of the conversion module, wherein the electrical distribution system is configured to be controlled by the control method of claim 1, and wherein, for each conversion module, the electronic control unit is configured to implement the regulation of the DC voltage delivered by the conversion module to the associated electrical load and the maintaining of the apparent power of the conversion module equal to the target value.

6. The electrical distribution system according to claim 4, wherein the group of transistors of each conversion module includes insulated-gate bipolar transistors.

7. The electrical distribution system according to claim 4, wherein the plurality of conversion modules includes at least ten conversion modules.

8. The electrical distribution system according to claim 4, wherein each conversion module also includes a protection circuit configured to make the single-phase AC current delivered by the power supply device flow between the input terminals of the conversion module by short-circuiting the group of transistors in case of failure of the conversion module and/or the associated electrical load.

9. The electrical distribution system according to claim 4, wherein the power supply device is configured to deliver a three-phase AC current and an AC voltage between 10 kV and 35 kV per phase, the first current corresponding to a first phase of the three-phase AC current and the first voltage corresponding to a first phase of the three-phase AC voltage, wherein the plurality of conversion modules forms a first group of conversion modules, wherein the electrical distribution system includes, in addition, a second group of conversion modules and a third group of conversion modules, the conversion modules of the second group of conversion modules and the third group of conversion modules being identical to the conversion modules of the first group of conversion modules, and each being respectively associated with an electrical load, and wherein:

the conversion modules of the first group of conversion modules are connected in series to the power supply device so that the first current flows between the input terminals of all the conversion modules of the first group and so that the first voltage is applied to all the conversion modules of the first group, the conversion modules of the second group of conversion modules are connected in series to the power supply device so that a second single-phase AC current, corresponding to a second phase of the three-phase AC current, flows between the input terminals of all the conversion modules of the second group and so that a second single-phase AC voltage, corresponding to a second phase of the three-phase AC voltage, is applied to all the conversion modules of the second group, and the conversion modules of the third group of conversion modules are connected in series to the power supply device so that a third single-phase AC current, corresponding to a third phase of the three-phase AC current, flows between the input terminals of all the conversion modules of the third group and so that a third single-phase AC voltage, corresponding to a third phase of the three-phase AC voltage, is applied to all the conversion modules of the third group.

10. The electrical distribution system according to claim 4, wherein the electrical distribution system is a data center comprising a plurality of racks, each electrical load and each conversion module being associated with a rack, each electrical load being arranged in the associated rack, each conversion module being fixed to the associated rack or integrated into the associated rack.

* * * * *